United States Patent [19]
Johnson

[11] Patent Number: 5,055,216
[45] Date of Patent: Oct. 8, 1991

[54] MULTILAYER CLEANSING TISSUE CONTAINING A PERFUME AND/OR AN EMOLLIENT SUITABLE FOR HUMAN SKIN

[76] Inventor: Aslaug R. Johnson, 3276 N. Lakeshore Dr. #14A, Chicago, Ill. 60657

[21] Appl. No.: 351,068

[22] Filed: May 12, 1989

[51] Int. Cl.$^5$ ........................ C11D 17/06; C11D 3/50; C11D 9/44
[52] U.S. Cl. ................................ 252/91; 15/209 R; 252/90; 252/92; 252/134; 252/174; 252/DIG. 5
[58] Field of Search ..................... 252/174, 91, 92, 90, 252/DIG. 5, 134; 15/209 R

[56] References Cited

U.S. PATENT DOCUMENTS

| | | | |
|---|---|---|---|
| 1,743,512 | 1/1930 | Aisen | 252/91 |
| 2,389,736 | 11/1945 | Muise | 252/91 |
| 2,932,839 | 4/1960 | Flanigan et al. | 15/122 |
| 3,121,249 | 2/1964 | Affleck et al. | 252/91 |
| 3,293,683 | 12/1966 | Wyant | 252/91 |
| 3,393,417 | 7/1968 | Schneider | 252/174 |
| 4,426,418 | 1/1984 | Coleman et al. | 252/91 |
| 4,462,981 | 7/1984 | Smith | 252/91 |
| 4,559,157 | 12/1985 | Smith et al. | 252/90 |
| 4,603,069 | 7/1986 | Hag et al. | 428/76 |

*Primary Examiner*—Paul Lieberman
*Assistant Examiner*—A. Beadles-Hoy
*Attorney, Agent, or Firm*—Samuel Kurlandsky

[57] ABSTRACT

Cleansing tissue formed of a plurality of fibrous layers laminated together, at least one of the layers being processed differently from the other layers to provide properties distinctive from the other layer or layers. For example, one layer may be treated with a perfume or fragrance material, while the other layer or other layers may be provided with a liquid cleansing agent. In a preferred embodiment the cleansing tissue is formed of three layers, the inner layer containing a perfume or fragrance material, while the two outer layers contain a liquid cleansing agent. Alternatively, one outer layer may be left free of any additives so that is may serve as a dry towel. The perfume or other fragrance material imports a pleasant scent to the skin of the person who uses the multilayer tissue to refresh himself, while the cleansing agent serves to clean the person's skin.

9 Claims, 1 Drawing Sheet

MULTILAYER CLEANSING TISSUE CONTAINING A PERFUME AND/OR AN EMOLLIENT SUITABLE FOR HUMAN SKIN

BACKGROUND OF THE INVENTION

1. Field of the Invention

The present invention relates to cleansing tissues, and more particularly refers to a cleansing tissue formed of a plurality of layers laminated together, at least one of the layers having been subjected to treatment different from that of the other or others.

2. Description of the Prior Art

Cleansing tissues have been provided in the prior art having a liquid impregnated therein for moistening and cleansing the skin, particularly after eating a meal, or after the skin has been subjected to environmental conditions which tend to dry the skin. However, after the skin has been treated with the moist tissue, it is necessary to utilize another tissue or towel which is dry to remove excess moisture. It is often desirable additional to treat the skin with a fragrance-imparting material to freshen up the skin. This requires another tissue or container for such material. Additionally, it may desirable to remove excess cleansing agent and material picked up by the cleansing agent. This requires still another tissue.

SUMMARY OF THE INVENTION

It is an object of the invention to provide a tissue formed of a plurality of layers, at least one layer of which is treated with a material which it is desired to be applied to the skin of a person.

It is a further object of the invention to provide a multilayer tissue at least one layer of which contains a cleansing agent.

It is an additional object to provide a multilayer tissue one layer of which contains a perfume or scenting agent.

It is another object to provide a multilayer tissue one layer of which contains an emollient for soothing the skin.

It is still further an object of the invention to provide a multilayer tissue having one layer which is dry and can be used to wipe off the drying agent applied by one of the other layers.

The foregoing and other objects, advantages and characterizing features of the invention will become apparent from the following description of certain illustrative embodiments thereof, considered together with the accompanying drawing, wherein like reference numerals signify like elements throughout the various features.

According to the invention, a multilayer cleansing tissue is provided by forming a plurality of tissue layers and laminating them together. The several layers are separately treated prior to lamination or subsequently thereto by impregnating them with the desired materials. The layers may also be impregnated during the paper making process used to fabricate the layers. The result, after lamination, is a tissue having several functions such as moisturizing, cleansing, scenting, and drying.

DESCRIPTION OF THE PREFERRED EMBODIMENTS

Figure 1:
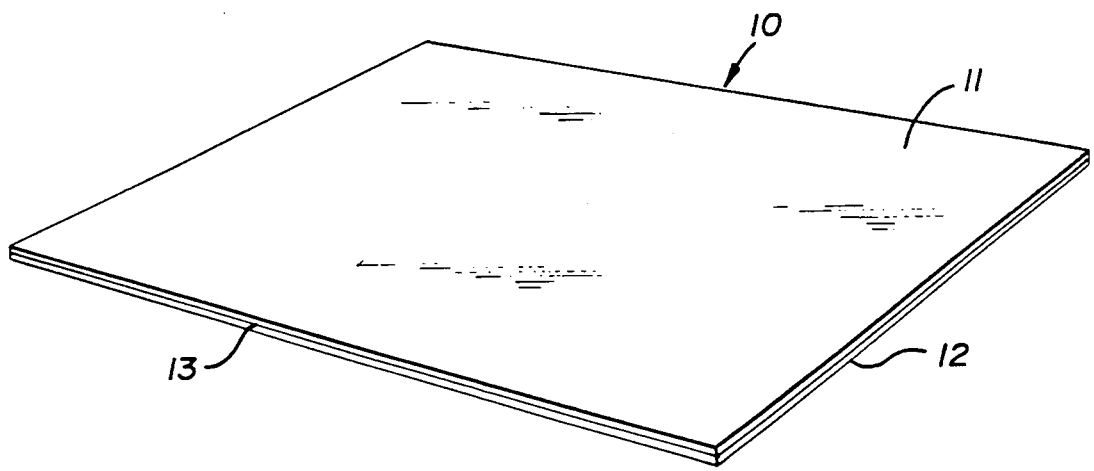
FIG. 1 is a perspective view of a multilayer tissue according to the invention having two layers.

Referring to the drawing, a cleansing tissue or towel 10 is shown, having a first layer 11 and a second layer 12. The layers are laminated together at an interface 13. This may be accomplished by superimposing one wet layer over the other during the paper-making process. Lamination may also be accomplished by needling the two layers together by a commonly known process.

Figure 2:
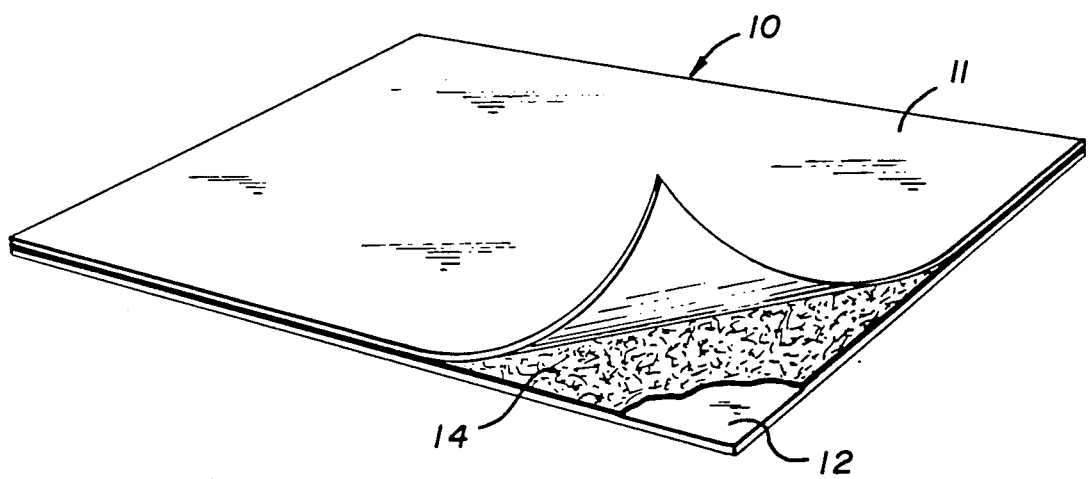
FIG. 2 is a perspective view of a multilayer tissue according to the invention having two layers laminated together by an adhesive.

As shown in FIG. 2, the layers 11 and 12 may also be laminated together by means of an adhesive. Many known adhesives may be used, such as various latex adhesives, gums, acetates such as polyvinyl acetate, as well as other known adhesives used in adhering paper.

The layers may be formed of any suitable fibrous material such as cellulose fibers or synthetic fibers such as polyester fibers, nylon fibers, or acrylic fibers. The preferred material is cellulosic fibers such as those which are commonly used in making paper tissue. The layers may be formed separately in the paper making process, treated with the suitable impregnating materials, and subsequently laminated together at the interface 13 by means of a suitable paper adhesive 14. The layers 11 and 12 may be alternatively laminated together during the paper making process.

In practicing the present invention as shown in FIGS. 1 and 2, one layer of the multilayer tissue may be impregnated or treated with a cleansing agent such as a liquid soap or detergent. The other layer may be impregnated with a perfume or other scenting agent. Alternatively, the cleansing agent and scenting agent may be incorporated in one layer and the other layer left free of additives to serve as a dry towel.

Figure 3:
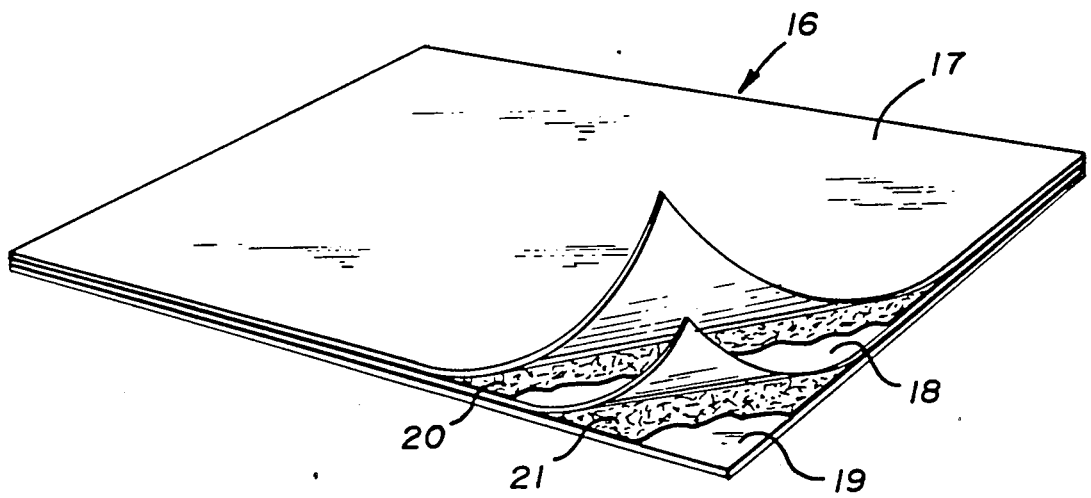
FIG. 3 is a perspective view of a multilayer tissue according to the invention having three layers laminated together by an adhesive.

Referring to FIG. 3, a preferred embodiment of the invention is shown, comprising a cleansing tissue 16 formed of three layers 17, 18 and 19. The layers 17, 18 and 19 are laminated together at adhesive interfaces 20 and 21. Any of the adhesives described above may be utilized. However, if a water-impermeable adhesive is used, it should be applied in a pattern with open spaces provided to permit interchange of the impregnated material from the center layer 18 to one or both of the outer layers, where such interchange is desired.

In the preferred embodiment, the center layer 18 may be impregnated with a fragrance, oil base perfume or scenting agent. One or both outer layers may be impregnated with a cleansing agent such as an alcohol base or water base detergent or other known cleansing agents. Where both outer layers are impregnated with a cleansing agent, either surface may be use for cleansing while the center layer 18 provides a scent to be applied to freshen up the skin. If one outer layer is left untreated, it may be used as a drying towel. Because the molecular size of the fragrance oil applied to the inner layer 18, it does not migrate into the cleansing layer during storage, but migrates to the surface of the tissue during use to provide a refreshing scent to the skin.

The prime objectives of the cleansing tissue of the present invention are to cleanse and dry the skin and to leave the skin in a dry and freshly scented condition. The advantage of the present invention is that all of the enumerated objectives may be obtained through the use of only a single piece of tissue.

The cleansing tissue or towel of the present invention has many uses. For example, it may be used by both passengers and crew before landing during a transatlantic flight. It may be used by persons after playing tennis or golf. It may be used in camping or traveling when showers are not available. It may be used by persons working in an office all day and before attending a dinner meeting. It may be used to remove perspiration by models exhibiting clothes under hot lights or while changing into other clothing to be subsequently modeled.

Although the invention has been described in connection with specific embodiments thereof, it is evident that many alternatives and modifications, and variations will be apparent to those skilled in the art in the light of the foregoing description and drawing. Accordingly, it is intended to embrace all such alternatives, modifications and variations within the spirit and scope of the invention as defined by the appended claims.

Invention is claimed as follows:

1. A multilayer cleansing tissue formed of three layers of a fibrous material laminated together, a face of one of said outer layers being affixed to a face of said inner layer over the entire surface thereof, and a face of the other of said outer layers being affixed to the other face of said inner layer over the entire surface thereof, the inner one of said layers having a fragrance bearing material provided therein in an amount effective to provide a fragrant scent and being free of any cleansing agent, and each of the two outer layers having a cleansing agent provided therein in an amount effective to provide a cleansing action when said cleansing tissue is rubbed on a surface, both of said outer layers being free of a fragrance bearing material.

2. A multilayer cleansing tissue according to claim 1, wherein said fibrous material is paper.

3. A multilayer cleansing tissue according to claim 2, wherein said cleansing agent is a liquid soap.

4. A multilayer cleansing tissue according to claim 2, wherein said cleansing agent is a liquid containing a detergent.

5. A multilayer cleansing agent according to claim 2, wherein said cleansing agent has an alcohol base.

6. A multilayer cleansing tissue according to claim 2, wherein said fragrance agent is an oil base perfume.

7. A multilayer tissue according to claim 2, wherein one of said layers contains lanolin.

8. A multilayer tissue according to claim 2, wherein one of said layers contains glycerol.

9. A multilayer tissue according to claim 2, wherein one of said layers contains an emollient.

* * * * *